Figure 1:
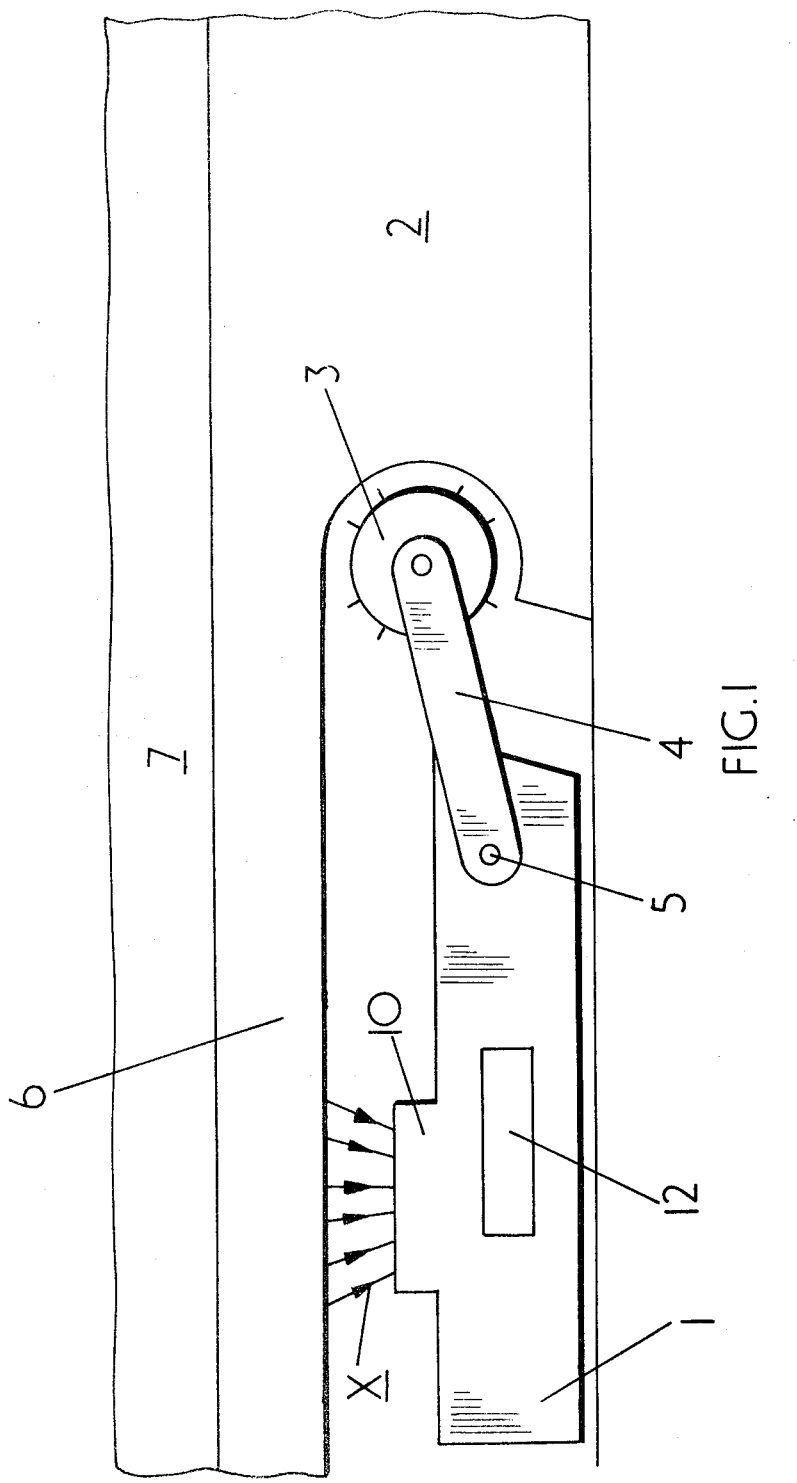

United States Patent [19]

Fecitt

[11] 4,428,618
[45] Jan. 31, 1984

[54] MINING MACHINE CONTROL SIGNAL PROCESSING SYSTEM

[75] Inventor: Graham J. Fecitt, Bury, England

[73] Assignee: Coal Industry (Patents) Limited, London, England

[21] Appl. No.: 306,715

[22] Filed: Sep. 29, 1981

[30] Foreign Application Priority Data

Oct. 28, 1980 [GB] United Kingdom ............... 8034685

[51] Int. Cl.³ .................... E21C 35/08; E21C 27/24
[52] U.S. Cl. .................................. 299/1; 364/183; 364/420
[58] Field of Search ............ 364/420, 183, 571; 299/1

[56] References Cited

U.S. PATENT DOCUMENTS

| 4,155,594 | 5/1979 | Hartley et al. ............... 299/1 |
| 4,228,508 | 10/1980 | Benthaus ..................... 364/420 |
| 4,331,262 | 5/1982 | Snyder ..................... 364/571 X |

FOREIGN PATENT DOCUMENTS

| 1045874 | 10/1966 | United Kingdom . |
| 1130814 | 10/1968 | United Kingdom . |
| 1888308 | 4/1970 | United Kingdom . |
| 1203362 | 8/1970 | United Kingdom . |
| 1271682 | 4/1972 | United Kingdom . |
| 1376932 | 12/1974 | United Kingdom . |
| 1383756 | 2/1975 | United Kingdom ............ 299/1 |
| 1427751 | 3/1976 | United Kingdom . |

Primary Examiner—Ernest R. Purser
Attorney, Agent, or Firm—Stevens, Davis, Miller & Mosher

[57] ABSTRACT

A signal processing system for an underground mining machine having a steerable mineral cutter and a sensor which senses natural radiation emitted from rock strata overlaying the radiation absorbing mineral and which derives a sensor signal representative of the cutting horizon of the cutter, comprises processing means for receiving and processing the sensor signal to derive an operational signal indicative of the cutter horizon of the cutter, calibration means for accepting a fed in calibration signal representative of a known existing condition of the cutting horizon and comparator means for comparing the derived operational signal with the calibration signal to determine an error in the derived operational signal and for instructing the processing means to apply a suitable correction to the derived operational signal.

10 Claims, 2 Drawing Figures

MINING MACHINE CONTROL SIGNAL PROCESSING SYSTEM

This invention relates to signal processing systems.

In particular, although not exclusively, the present invention relates to signal processing systems for use with underground mine excavating machines having cutters arranged to cut rock and/or mineral to form cut boundary profiles, the machines having sensors arranged to sense the cut boundary profiles in order to determine the cutting horizons of the cutters and to derive sensor signals dependant upon the sensed cut boundary profiles.

One kind of sensor used for steering a cutter of a coal winning machine in a coal seam senses the natural radiation emitted from overlaying rock strata and passing through a radiation absorbing, roof layer of coal left by the cutter, the sensor being arranged to derive a sensor signal dependant upon the amount of natural radiation sensed and thereby upon the thickness of the residual coal layer. The derived sensor signal is fed to a signal processing system which processes the signal and displays the sensed coal layer thickness on an indicator unit. Thus, a machine operator using the indicated thickness is able to steer the cutter to maintain a desired coal layer thickness and thereby maintain the cutter on a desired cutting horizon.

In the past in order to initially set up the sensor and signal processing system it has been necessary to use an external test unit which must be connected to the machine's signal processing system and to receive the derived sensor signal and which displays the radiation counts per preselected unit gate time. The operator then must read-off the coal thickness of the calibration site against the displayed counts per gate time from a count attenuation table of results obtained in a field survey previously conducted. The coal thickness figure obtained from the table is compared with that displayed on the signal processing system's indicator unit and any discrepancy must be corrected by manually adjusting a gate time potentiometer provided in the signal processing system.

It will be appreciated that such an initial setting procedure suffers from the disadvantages that it is time consuming and relies upon operator skill. Also it is necessary to conduct a field survey. Moreover, it is necessary to have the external test unit and a copy of the correct count attenuation table which tends to be easily mislaid or forgotten.

An object of the present invention is to provide a signal processing system which overcomes or tends to reduce the above mentioned disadvantages.

According to the present invention a signal processing system for equipment having a sensor for sensing a preselected parameter and deriving a sensor signal dependant upon the sensed preselected parameter, comprises processing means for receiving and processing the sensor signal to derive an operational signal indicative of the preselected parameter, and calibration means having input means for feeding in a calibration signal representative of a known existing condition of the preselected parameter and comparator means for comparing the derived operational signal with the calibration signal to determine any error in the operational signal and for instructing the processing means to apply a suitable correction to the derived operational signal should any error be determined.

The present invention also provides a signal processing system for a mining machine having a cutter for excavating rock or mineral from a working face to form a cut boundary profile and having a sensor for sensing a preselected parameter associated with the cut boundary profile and to derive a sensor signal dependant upon the sensed preselected parameter, the system comprising processing means for receiving and processing the sensor signal to derive an operational signal indicative of the preselected parameter, and calibration means having input means for feeding in a calibration signal representative of a known existing condition of the preselected parameter, and comparator means for comparing the derived operational signal with the calibration signal to determine any error in the derived operational signal for instructing the processing means to apply a suitable correction to the derived operational signal should any error be determined.

The present invention also provides a signal processing system for a mining machine having a cutter for excavating rock or mineral from a working face to form a cut boundary profile, steering means for controlling the cutting horizon of the cutter, and a sensor for sensing a preselected parameter associated with the cutting horizon of the cutter and for deriving a sensor signal dependant upon the sensed cut boundary profile the system comprising processing means for receiving and processing the sensor signal to derive an operational signal indicative of the cutting horizon of the cutter, calibration means having input means for feeding in a calibration signal representative of a known existing condition of the cutting horizon of the cutter, and comparator means for comparing the derived operational signal with the calibration signal to determine any error in the derived operational signal and for instructing the processing means to apply a suitable correction to the derived operational signal should any error be determined.

Preferably, the corrected derived operational signal is fed to indicator means for a machine steering operator.

Preferably, the corrected derived operational signal is fed to control means for the machine's steering means.

Advantageously, the processing means monitors sensor signals for a initially preselected gate time.

Preferably, the processing means varies the gate time from the initially preselected gate time in order to apply a suitable correction to the derived operational signal.

Preferably, the processing means monitors the sensor signal over a plurality of gate time periods in order to derive the operational signal.

Advantageously, the processing means monitors the sensor signal over a preselected number of gate time periods before calibrating means compares the derived operational signal with the calibration signal to determine any error in the derived operational signal.

Preferably, the processing means has a normal operational mode and a calibration mode, the processing means being switched to the normal operational mode from the calibration mode when the calibration means has completed its calibration procedure.

Advantageously, the calibration means continues its calibration procedure repeating the calibration sequence until no error or an acceptably small error is determined on at least two successive calibration sequences.

The present invention also provides a mining machine in combination with a signal processing system as defined above.

Figure 2:
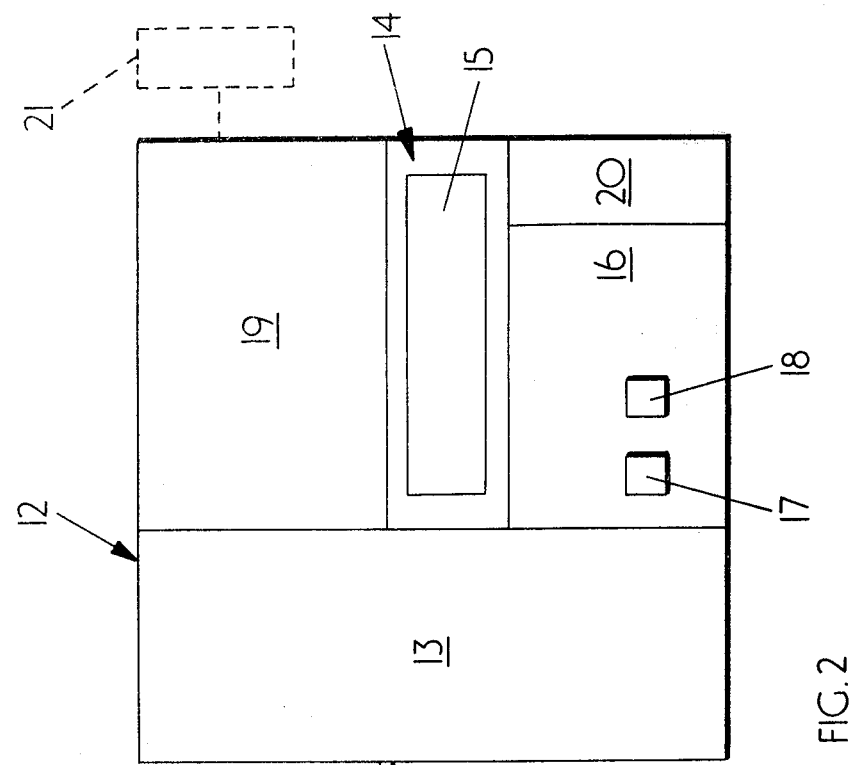
Figure 2:
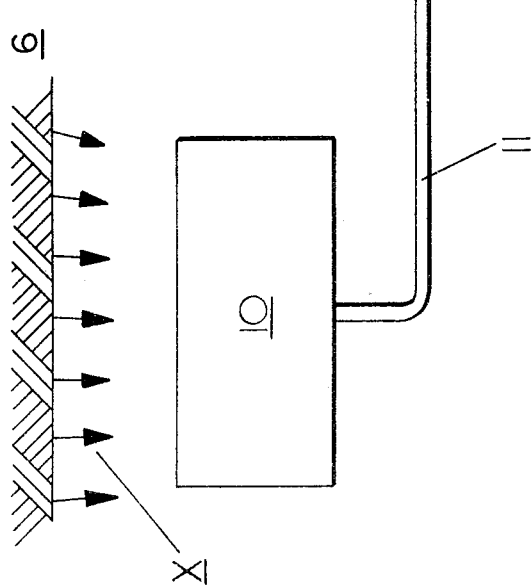

By way of example only, one embodiment of the present invention now will be described with reference to the accompanying drawings in which:

FIG. 1 is an incomplete diagrammatic side elevation of a coal winning machine in an operational position, the machine comprising a signal processing system according to the present invention; and FIG. 2 is a block electrical circuit diagram of a portion of the signal processing system.

FIG. 1 shows a coal winning machine 1 arranged to traverse to and fro along the working face 2 of a longwall face in a coal seam. The machine has a rotary cutter 3 for winning coal from the working face mounted on a ranging arm 4 which can be pivoted about an axis 5 under the control of hydraulic steering rams (not shown) to vertically adjust the cutting horizon of the cutter. As seen in FIG. 1 the cutter excavates coal from the working face to leave a residual layer of coal 6 constituting the mine roof, the layer of roof coal being left beneath an overlaying shale strata 7. As the machine traverses along the longwall face the vertical position of the cutter is varied by pivotally adjusting the position of the arm in order to maintain the residual roof coal layer substantially within a desired thickness.

The winning machine is provided with a sensor 10 for sensing natural radiation (indicated by arrow x) emitted by the overlaying shale strata and passing through the radiation absorbing layer of roof coal. Thus, by sensing the amount of natural radiation received it is possible to determine the thickness of the sensed roof coal layer. The sensor 10 is adapted to derive sensor signals which is dependant upon the received natural radiation, the signal being fed along line 11 (see FIG. 2) to a signal processing system 12 also provided on the mining machine.

The signal processing system 12 comprises processing means 13 for receiving and processing the derived sensor signal and for deriving an operational signal indicative of the cutting horizon of the cutter, the derived operational signal being fed to an indicator unit 14 including display window 15 for displaying the determined roof coal layer thickness.

The signal processing system also comprises calibration means 16 having input means constituted at least in part by two press buttons 17 and 18 for feeding into the signal processing system a calibration signal representative of a known existing condition of the cutting horizon i.e. the actual measured thickness of the roof coal layer at the calibration site. The calibration means also comprises comparator means 19 for comparing the derived operational signal with the calibration signal to determine any error in the derived operational signal and for instructing the processing means to apply a suitable correction to the derived operational signal should any error be determined in the calibration procedure.

In operation, the operator presses button 18 until the display in window 15 is equal to the aforementioned measured existing coal thickness, the display changing in increments until the desired figure is reached. The button then is released so that the indicated figure remains constant and is stored by the processing means. For example, if the actual measured thickness is ten centimeter button 18 is pressed until the indicated figure increases in increments from zero to ten. The button then is released so that the indicated figure ten remain on display in the window.

Next the machine operator presses button 17 to initiate the calibration process during which both buttons 17 and 18 are locked out. Upon initiating the calibration process the processing system stores a preselected gate time of, for example, 0.75 seconds and a stored time constant. The calibration means 16 is provided with a store or memory unit 20 for storing the desired parameters.

The processing means 13 receives the sensor signal for a period of one preselected gate time thereby counting the number of radiation pulses received during the preselected gate time. The count is multiplied by the time constant and used by the calibration means to pre-set a "Total Count" store provided within the store or memory unit 20 constituting part of the calibration means.

The calibration means continues with the calibration procedure until a full calibration sequence comprising a further preselected number of cycles have been performed. For example, after the completion of the first cycle pre-setting the "Total Count" store a further thirty-two cycles are performed, each over the aforementioned preselected gate time period. After each cycle the "Total Count" in store is updated. After the completion of the calibration sequence the coal thickness is determined from the final "Total Count" in store. The comparator means 19 compares the derived coal thickness with the actual measured existing coal thickness or compares signals representation of the two coal thicknesses and derives a further error signal indicative of any discrepancy between the two compared coal thicknesses, the error signal indicating the error in the derived coal thickness.

The error signal is used to instruct the processing means to apply a suitable correction to the derived operational signal by adjusting the preselected gate time, i.e. in the given example by suitably adjusting the preselected gate time period from 0.75 seconds. For example, if the error indicates that the derived coal thickness is too great i.e. in the given example over ten centimeters then the gate time period is increased by an appropriate amount thereby increasing the counts per gate time which is indicative of a relatively thinner coal layer thickness. If the error indicates that the derived coal thickness is less than the true thickness then the gate time period is decreased to reduce the counts received by gate time period.

The modified gate time period then is fed into the store or memory means 20 and a further thirty-two cycles are repeated to determine a further error in the derived actual true coal thicknesses. Should any appreciable or unacceptably large error be determined the gate time period is further suitably adjusted and the thirty-two calibration cycles repeated.

The above procedure is repeated until two successive sequences show no discrepancy or the same acceptable discrepancy between the derived and true coal thicknesses. The calibration sequence then is ended and the processing means derives the operational signal from the sensor signal using the last determined gate time period.

The signal processing system then is calibrated enabling the machine to commence its traverse along the longwall face with the machine operator able to rely on the indicated coal thickness.

In other embodiments of the invention the operational signal derived by the processing means is fed to a control system 21 for controlling the cutting horizon of the cutter, the control system receiving the derived operational signal and steering the cutter in accordances with the derived operational signal to leave a desired roof coal thickness.

It will be appreciated that the present invention provides a reliable and quick means for calibrating the signal processing system from site to site, for example the amount of radiation emitted from the overlaying strata typically will vary from site to site as will the absorption characteristic of the coal contained in the residual roof layer.

I claim:

1. A signal processing system for a mining machine having a cutter for excavating rock or mineral from a working face to form a cut boundary profile, steering means for controlling the cutting horizon of the cutter, and a sensor for sensing a preselected parameter associated with the cutting horizon of the cutter and for deriving a sensor signal dependent upon the sensed cut boundary profile, the system comprising a processing means for receiving and processing the sensor signal to derive an operational signal indicative of the cutting horizon of the cutter, calibration means having manually activated input means for feeding in a calibration signal representative of a known existing condition of the cutting horizon of the cutter, and comparator means for comparing the derived operational signal with the calibration signal to determine any error in the derived operational signal and for instructing the processing means to apply a suitable correction to the derived operational signal should any error be determined.

2. A system as claimed in claim 1, in which the corrected derived operational signal is fed to indicator means for a machine steering operator.

3. A system as claimed in claim 2, in which the corrected derived operational signal is fed to control means for the machine's steering means.

4. A system as claimed in claim 3, in which the processing means monitors the sensor signal for an initially preselected gate time.

5. A system as claimed in claim 4, in which the processing means varies the gate time from the initially preselected gate time in order to apply a suitable correction to the derived operational signal.

6. A system as claimed in claim 5, in which the processing means monitor the sensor signal over plurality of gate time periods, in order to derive the operational signal.

7. A system as claimed in claim 6, in which the processing means monitors the sensor signals over a preselected number of gate time periods before calibrating means compares the derived operational signal with the calibration signal to determine any error in the derived operational signal.

8. A system as claimed in claim 7, in which the processing means has a normal operational mode and a calibration mode, the processing means being switched to the normal operational mode from the calibration mode when the calibration means has completed its calibration procedure.

9. A system as claimed in claim 7, in which the calibration means continues its calibration procedure repeating the calibration sequence until no error or an acceptably small error is determined on at least two successive calibration sequences.

10. The system of claim 5 in which the sensor senses natural radiation emitted from rock strata overlaid by a radiation absorbing mineral which is removed by said mineral cutter.

* * * * *